(12) United States Patent
Fujii et al.

(10) Patent No.: US 11,705,602 B2
(45) Date of Patent: Jul. 18, 2023

(54) BATTERY PACK HAVING INTERLOCK STRUCTURE

(71) Applicant: HONDA MOTOR CO., LTD., Tokyo (JP)

(72) Inventors: Ryo Fujii, Saitama (JP); Ryo Kitano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 638 days.

(21) Appl. No.: 16/707,641

(22) Filed: Dec. 9, 2019

(65) Prior Publication Data

US 2020/0194767 A1    Jun. 18, 2020

(51) Int. Cl.
| | |
|---|---|
| *H01M 50/296* | (2021.01) |
| *H01M 50/262* | (2021.01) |
| *H01M 50/204* | (2021.01) |
| *H01M 50/271* | (2021.01) |
| *H01M 50/505* | (2021.01) |
| *H01M 50/517* | (2021.01) |

(52) U.S. Cl.
CPC ....... *H01M 50/296* (2021.01); *H01M 50/204* (2021.01); *H01M 50/262* (2021.01); *H01M 50/271* (2021.01); *H01M 50/505* (2021.01); *H01M 50/517* (2021.01)

(58) Field of Classification Search
CPC .......... H01M 50/20; H01M 50/50–502; B60K 2001/0466
See application file for complete search history.

(56) References Cited

U.S. PATENT DOCUMENTS

| | | | |
|---|---|---|---|
| 11,355,806 B2 * | 6/2022 | Fujii | H01M 50/20 |
| 2011/0287298 A1 | 11/2011 | Park et al. | |
| 2017/0194771 A1 * | 7/2017 | Aoki | H01M 10/486 |
| 2018/0205058 A1 | 7/2018 | Lee et al. | |
| 2020/0119326 A1 * | 4/2020 | Yanagihara | H01M 50/20 |

FOREIGN PATENT DOCUMENTS

| | | | |
|---|---|---|---|
| CN | 102255064 A | | 11/2011 |
| JP | 2014-044854 A | | 3/2014 |
| JP | 2014-157741 A | | 8/2014 |
| JP | 2016115443 A | * | 6/2016 |

OTHER PUBLICATIONS

EPO English Machine Translation of JP 2016115443 originally published to Sugawara Hiroyuki on Jun. 23, 2016 (Year: 2016).*
Feb. 23, 2022, Chinese Office Action issued for related CN Application No. 201911256092.9.

* cited by examiner

*Primary Examiner* — Cynthia H Kelly
*Assistant Examiner* — Niara Trant
(74) *Attorney, Agent, or Firm* — Paratus Law Group, PLLC

(57) ABSTRACT

A battery pack having an interlock structure includes a plurality of battery modules, a case that includes a case main body accommodating the plurality of battery modules and a case cover covering the case main body, and a bus bar unit that electrically conducts two battery modules among the plurality of battery modules. The case cover includes a cover connecting portion connected to an accommodation item accommodated in the case or the case main body, and the bus bar unit includes a shielding portion that blocks the cover connecting portion from being removed from the accommodation item or the case main body.

9 Claims, 10 Drawing Sheets

BATTERY PACK HAVING INTERLOCK STRUCTURE

CROSS-REFERENCE TO RELATED APPLICATIONS

This application is based on and claims priority under 35 USC 119 from Japanese Patent Application No. 2018-235760 filed on Dec. 17, 2018.

TECHNICAL FIELD

The present invention relates to a battery pack having an interlock structure mounted on an electric vehicle or the like.

BACKGROUND ART

Conventionally, a large-capacity battery pack is mounted on an electric vehicle or the like. The battery pack accommodates a plurality of battery modules and a high-voltage circuit in a case. The case includes a case main body and a cover, and safety measures are applied such that the cover cannot be removed and the high-voltage circuit inside the case cannot be accessed unless a predetermined procedure is performed. For example, JP-A-2014-157741 discloses a structure in which a service plug capable of switching on/off the high-voltage circuit by insertion/pulling-out is provided, and engagement between the cover and the case main body cannot be released in a state in which the service plug is inserted, whereas the engagement between the cover and the case main body is released when the service plug is pulled out.

According to JP-A-2014-157741, the cover cannot be opened unless the service plug is removed and the high-voltage circuit is turned off, so that inadvertent access to the electrically connected high-voltage circuit can be prevented.

However, since an interlock structure according to JP-A-2014-157741 uses a ready-made service plug, it is necessary to design an interior of the battery pack in accordance with a shape and dimension of the service plug, which complicates a structure of the battery pack.

SUMMARY

An aspect of the present invention provides a battery pack having an interlocking structure that can be realized with a simple structure without using a ready-made product such as a service plug.

An embodiment of the present invention relates to a battery pack having an interlock structure. The battery pack includes:
 a plurality of battery modules;
 a case that includes a case main body accommodating the plurality of battery modules and a case cover covering the case main body; and
 a bus bar unit that electrically conducts two battery modules among the plurality of battery modules,
 wherein the case cover includes a cover connecting portion connected to an accommodation item accommodated in the case or the case main body, and
 wherein the bus bar unit includes a shielding portion that blocks the cover connecting portion from being removed from the accommodation item or the case main body.

According to the above embodiment of the present invention, since the bus bar unit includes the shielding portion that blocks the cover connecting portion from being removed from the accommodation item or the case main body, there is lower risk of removing of the case cover in a state in which the bus bar unit is not removed, that is, in a state in which the battery modules are electrically conducted. Therefore, the battery pack having the interlock structure can be realized with a simple configuration without using a ready-made product such as a service plug.

DESCRIPTION OF EMBODIMENTS

Hereinafter, embodiments of a battery pack having an interlock structure of the present invention will be described with reference to the accompanying drawings.

First Embodiment (Battery Pack)

Figure 1:
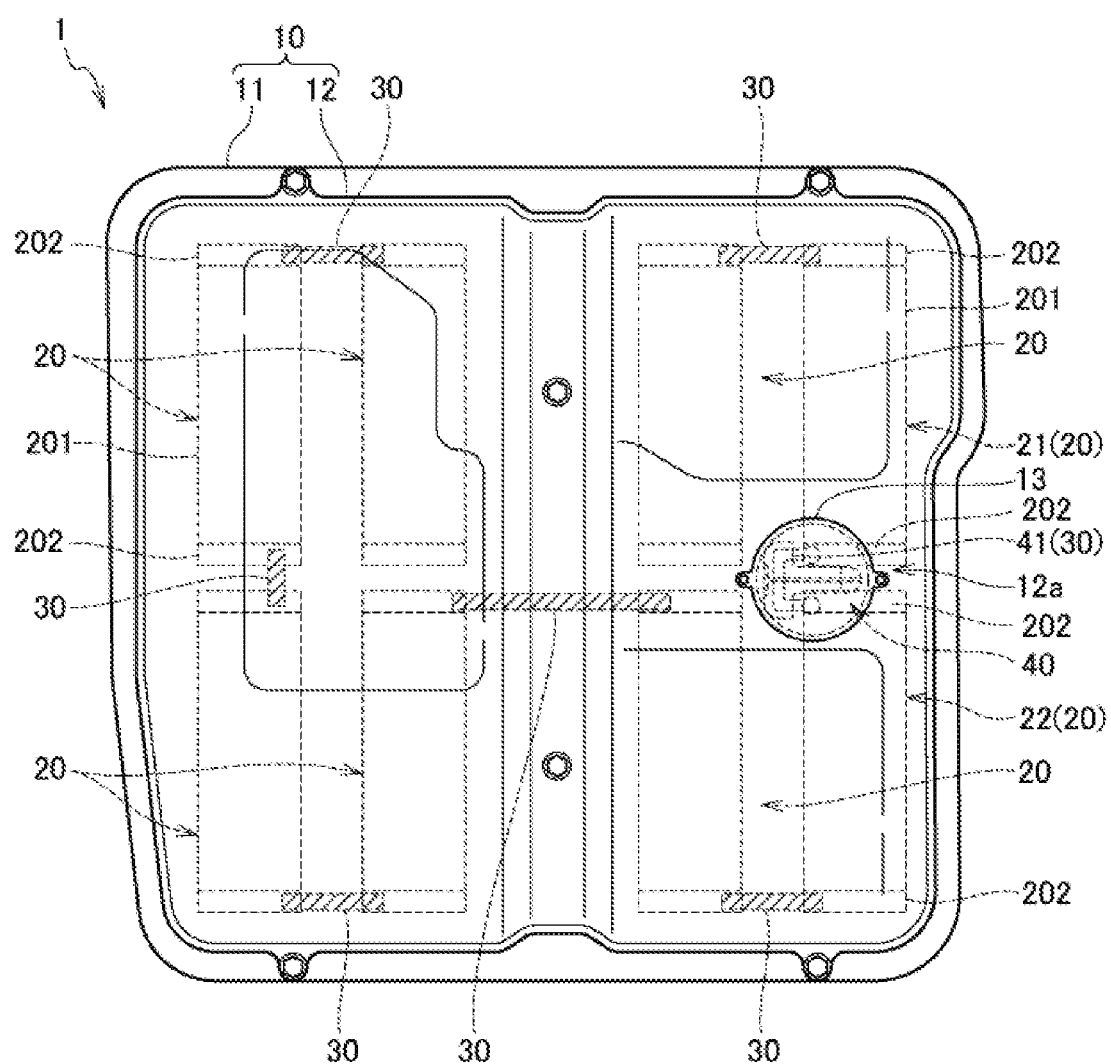
FIG. 1 is a plan view of a battery pack including an interlock structure according to a first embodiment of the present invention.
Figure 2:
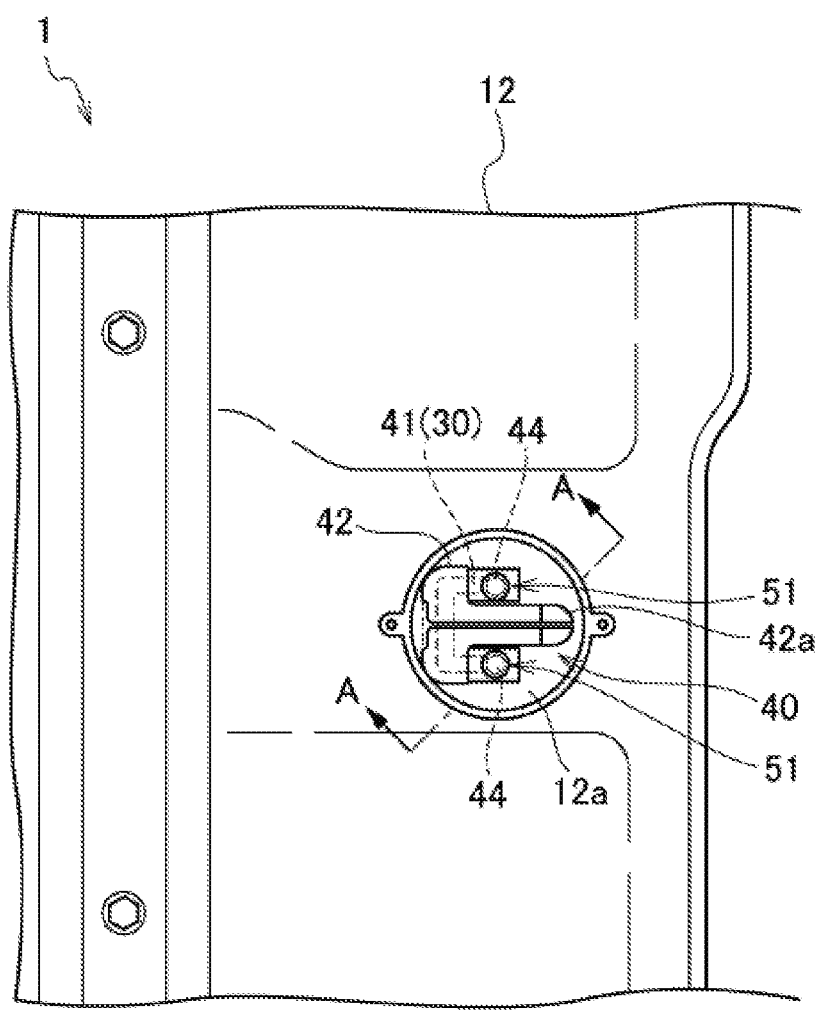
FIG. 2 is a plan view of a main part in a state in which a maintenance lid of the battery pack of FIG. 1 is removed.

As shown in FIGS. 1 and 2, a battery pack 1 according to a first embodiment includes a case 10 having a substantially rectangular shape in a plan view, and a plurality of (eight in this embodiment) battery modules 20 having a substantially rectangular shape in a plan view are accommodated in the case 10. The plurality of battery modules 20 are electrically connected in series by electrically conducting the battery modules 20 adjacent to each other via a bus bar 30. Two of the plurality of battery modules 20 (hereinafter, these two battery modules are referred to as battery modules 21, 22) are electrically conducted to each other via a bus bar unit 40 including the bus bar 30 (hereinafter referred to as a bus bar 41). Each of the battery modules 20 includes a cell stack body 201 configured by stacking a plurality of cells, and a pair of end plates 202 arranged on both sides of the cell stack body 201 in a stacking direction.

The case 10 includes a case main body 11 that accommodates the battery module 20, the bus bar 30, and the bus bar unit 40, and a case cover 12 that covers the case main body 11.

The case cover 12 has a substantially circular opening portion 12a on an upper surface. As shown in FIG. 1, the opening portion 12a is closed by a maintenance lid 13. At the time of maintenance of the battery pack 1, as shown in FIG. 2, by removing the maintenance lid 13, it is possible to access to electrical connection portions 51 that electrically connect the battery modules 21, 22 and the bus bar unit 40 from the opening portion 12a.

Figure 3:
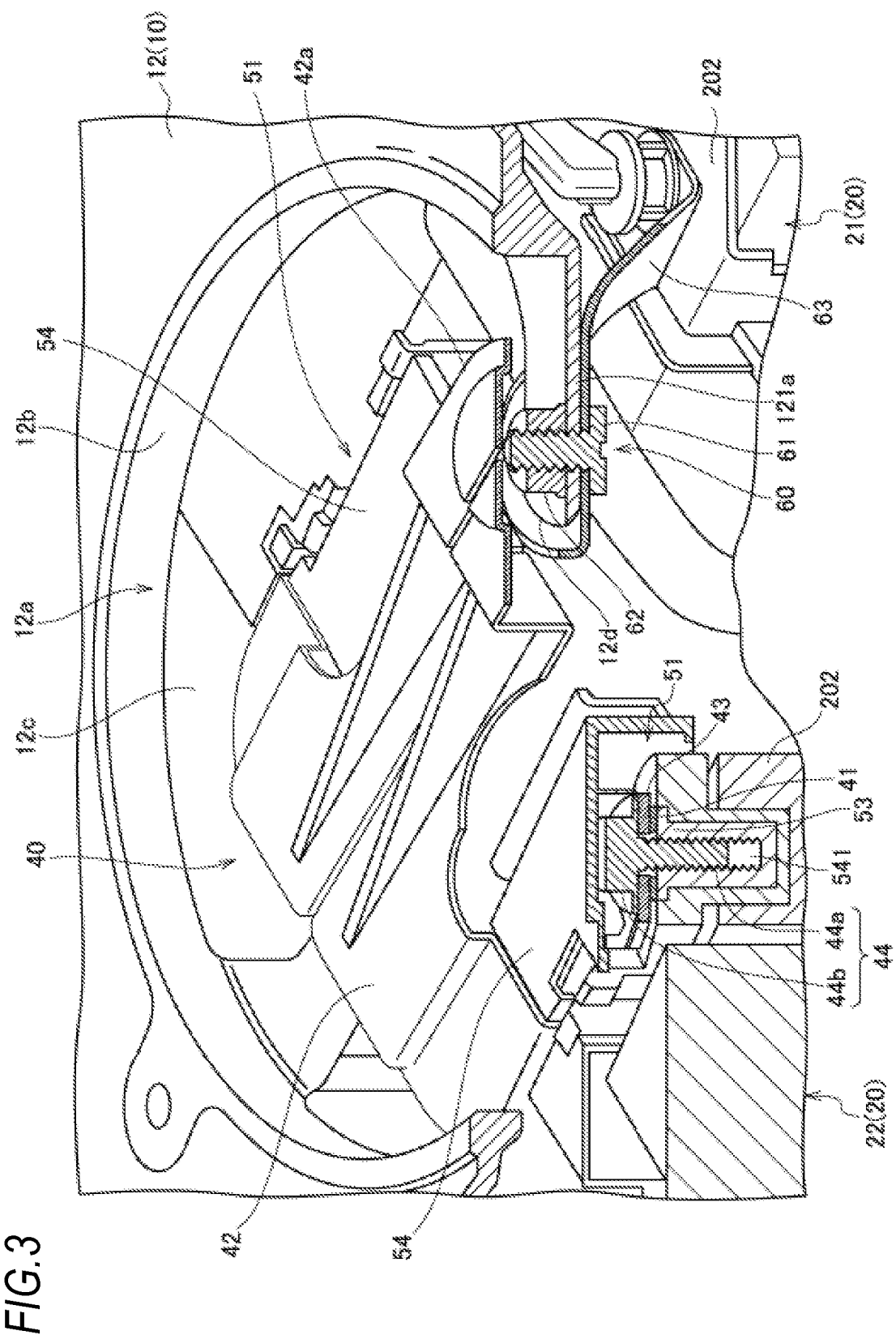
FIG. 3 is a sectional view taken along a line A-A of FIG. 2.

As shown in FIG. 3, the case cover 12 includes a cover connecting portion 12d connected to the battery modules 21, 22. The cover connecting portion 12d is formed so as to extend from a part of an edge 12b of the opening portion 12a toward an opening area 12c. An extending end portion 121a of the cover connecting portion 12d is fastened to an intermediate portion of a bracket 63 by a fixing portion 60 including a cover fixing bolt 61 and a nut 62. The bracket 63 is fixed across the end plate 202 of the battery module 21 and the end plate 202 of the battery module 22 that are adjacent to each other. That is, in this example, the cover connecting portion 12d is indirectly fixed to the battery modules 21, 22 via the bracket 63.

In the electrical connection portions 51, terminal portions 53 of the battery modules 21, 22 and the bus bar 41 of the bus bar unit 40 are fastened by bus bar fixing bolts 44, and are covered with openable/closable terminal covers 54, respectively.

(Bus Bar Unit)

Figure 4:
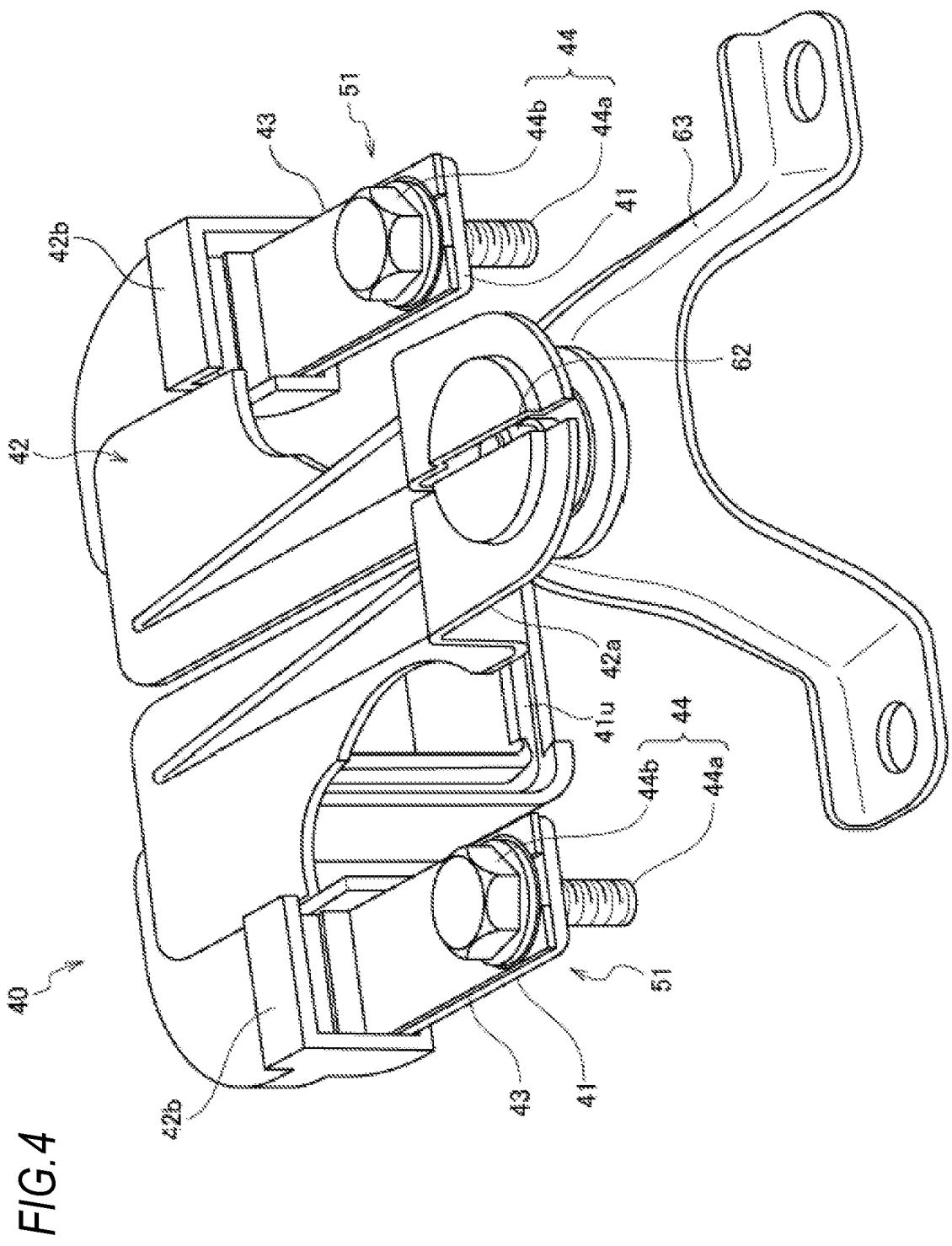
FIG. 4 is a perspective view of a bracket to which a bus bar unit and a cover connecting portion configuring the interlock structure according to the first embodiment of the present invention are fixed.

As shown in FIGS. 3 and 4, the bus bar unit 40 includes the bus bar 41 that electrically connects the battery modules 21, 22, an insulating bus bar cover 42 provided so as not to be removable from the bus bar 41, a pair of plate members 43, 43 arranged on tip end upper portions of the bus bar 41, and bus bar fixing bolts 44, 44 that fix the bus bar 41 and the plate members 43 to the battery modules 21, 22 at the electrical connection portions 51. The bus bar cover 42 is configured not to be removable from the bus bar 41. In addition, the bus bar fixing bolt 44 and the corresponding plate member 43 are connected to each other. In other words, the bus bar fixing bolt 44 is connected to the plate member 43 so as to be rotatable and not removable.

The bus bar fixing bolts 44 are fastened to the terminal portions 53 respectively arranged on the end plate 202 of the battery module 21 and the end plate 202 of the battery module 22 that face each other, and electrically connect the bus bar 41 and the battery modules 21, 22. The terminal portions 53 respectively arranged on the end plates 202 facing each other of the battery modules 21, 22 are connected with the bus bar 41 in this manner, so that a length of the bus bar unit 40 (the bus bar 41) can be shortened.

Since the cover connecting portion 12d is fixed to the intermediate portion of the bracket 63 fixed across the end plates 202 adjacent to each other of the battery modules 21, 22, the bus bar fixing bolts 44 and the cover connecting portion 12d can be gathered into one place, and an area of the opening portion 12a for accessing the fixing portion 60 can be reduced. The bus bar 41 includes a U-shaped portion 41u positioned between the adjacent end plates 202, and can absorb vertical vibrations due to bending of the U-shaped portion 41u.

In order to release an electrical conduction between the battery modules 21, 22, the bus bar fixing bolt 44 may be removed to release a connection (contact) between the terminal portion 53 in the electrical connection portion 51 and the bus bar 41 of the bus bar unit 40.

The bus bar cover 42 provided so as not to be removable from the bus bar 41 includes a shielding portion 42a that blocks the cover connecting portion 12d of the case cover 12 from being removed from the battery modules 21, 22. Specifically, the shielding portion 42a covers the cover fixing bolt 61 and the nut 62 from above, and is configured such that fixing between the cover connecting portion 12d and the bracket 63 by the cover fixing bolt 61 and the nut 62 cannot be released unless the bus bar cover 42 is removed.

As described above, since the bus bar unit 40 includes the shielding portion 42a that blocks the cover connecting portion 12d from being removed from the battery modules 21, 22 that are accommodation items, the case cover 12 is restricted from being removed in a state in which the bus bar unit 40 is not removed, that is, in a state in which the battery modules 21, 22 are electrically conducted. Therefore, the battery pack 1 having the interlock structure can be realized with a simple configuration without using a ready-made product such as a service plug. In addition, since the shielding portion 42a is provided in the bus bar cover 42, the number of components can be reduced. That is, the bus bar cover 42 serves both as an interlock function as well as a function of ensuring an insulation property of the bus bar 41.

The terminal portion 53 is formed of a conductive nut member including a screw hole 541 into which a shaft portion 44a of the bus bar fixing bolt 44 is screwed. The terminal portion 53 is embedded in the end plate 202 with the screw hole 541 facing upward. An upper surface of the plate member 43 and a head 44b of the bus bar fixing bolt 44 have the insulation property, and the head 44b of the bus bar fixing bolt 44, the plate member 43, the bus bar 41, and the battery module 20 (terminal portion 53) are arranged in this order from the opening portion 12a. As described above, since the head 44b of the bus bar fixing bolt 44 and the plate member 43 have the insulation property, the insulation property of a portion close to the opening portion 12a is ensured.

As shown in FIG. 4, the bus bar cover 42 includes a movement restricting portion 42b that restricts a movement of the plate member 43 in a state in which the bus bar fixing bolt 44 is loosened. A length of the shaft portion 44a of the bus bar fixing bolt 44 is longer than a maximum distance between the plate member 43 and the movement restricting portion 42b in a state in which the bus bar fixing bolt 44 is loosened. Therefore, even if the bus bar fixing bolt 44 is loosened, the bus bar fixing bolt 44 can be handled integrally with the bus bar unit 40 without being detached from the bus bar unit 40.

(Operation)

Figure 5:
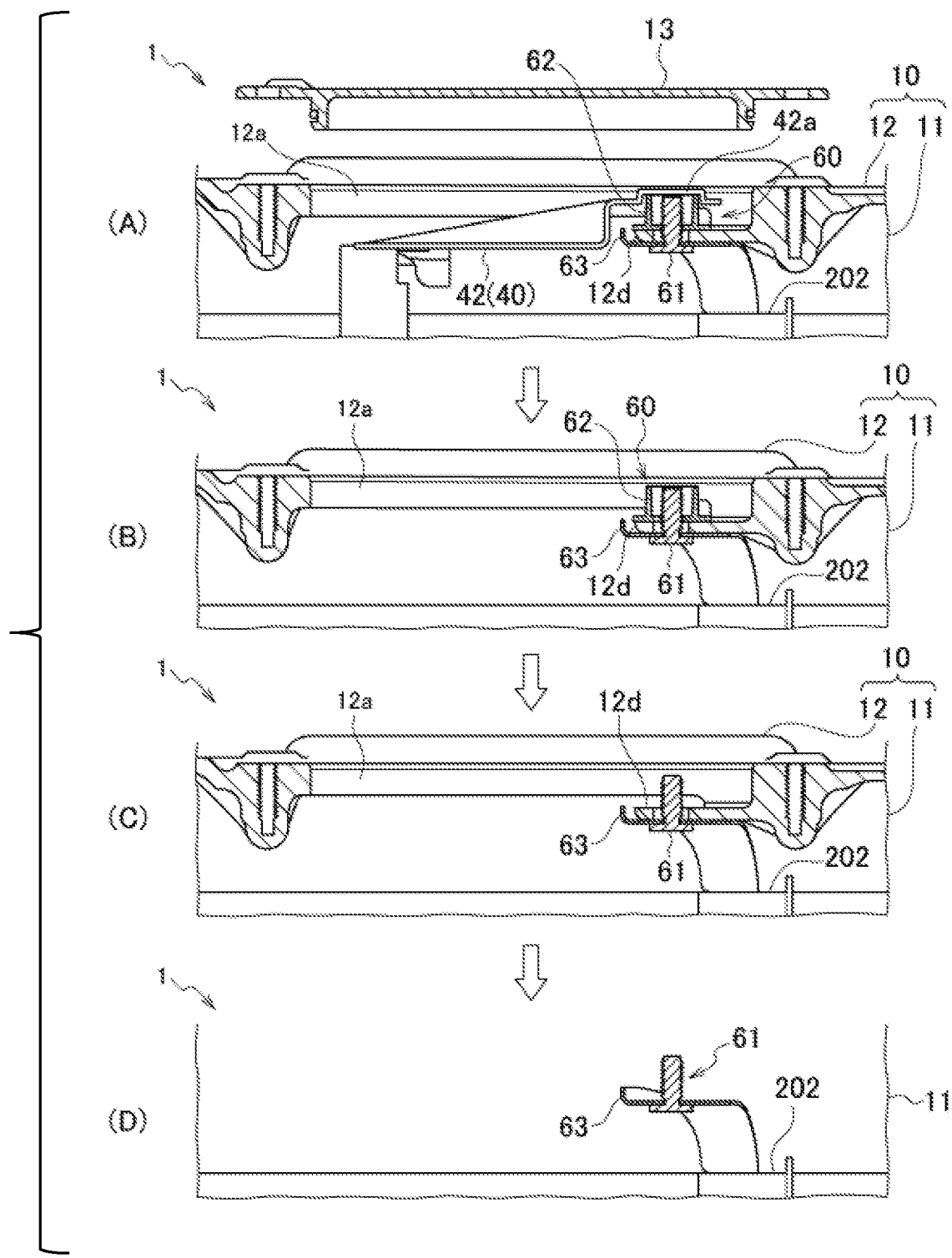
FIG. 5 is a sectional view of a main part of the battery pack for explaining a releasing procedure of the interlock structure, in which (A) is a state in which the maintenance lid is removed, (B) is a state in which the bus bar unit is removed, (C) is a state in which a nut is removed, and (D) is a state in which a case cover is removed.
Figure 6:
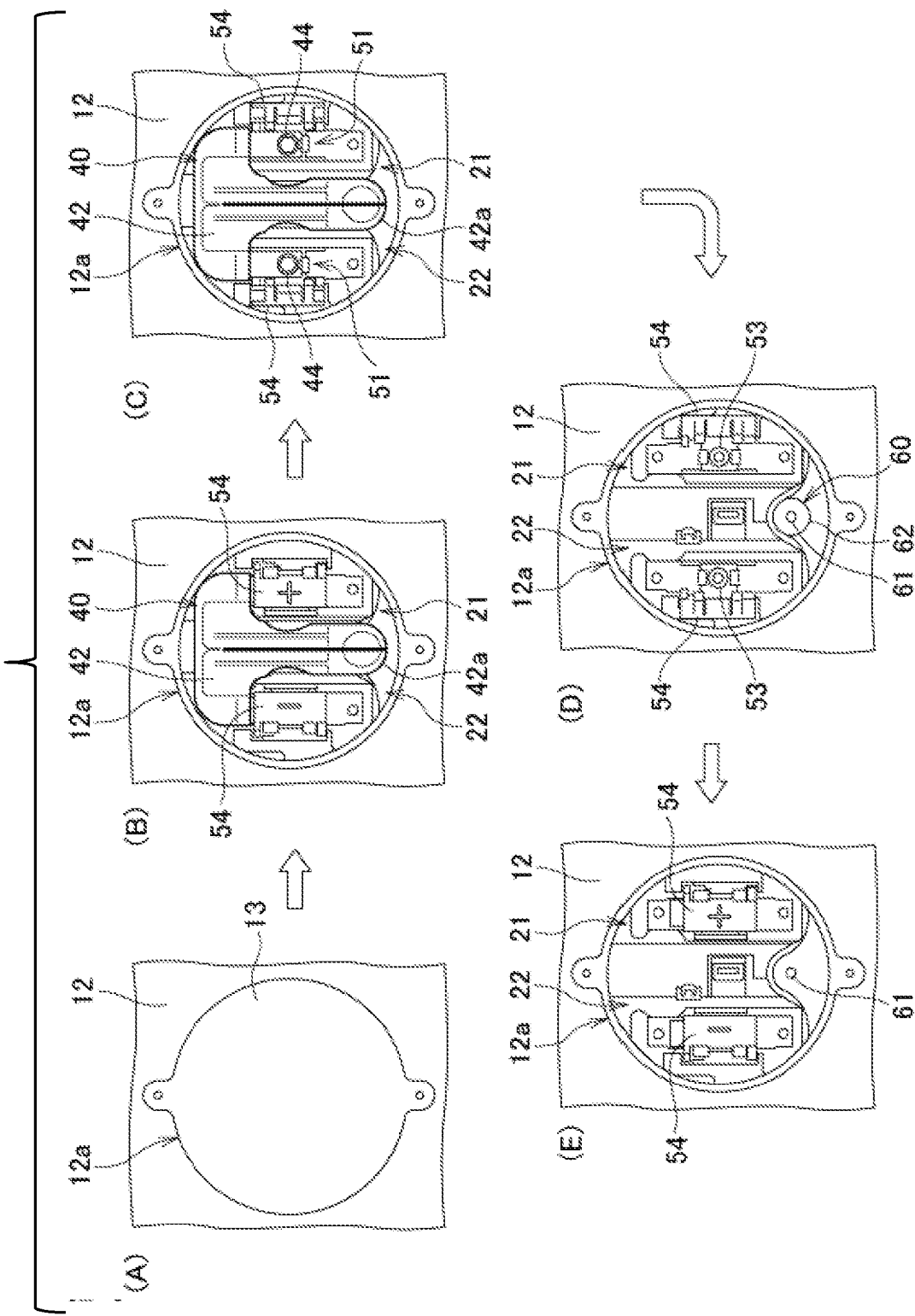
FIG. 6 is a plan view of a main part of the battery pack for explaining a releasing procedure of the interlock structure, in which (A) is a state in which the maintenance lid is attached, (B) is a state in which the maintenance lid is removed, (C) is a state capable of accessing to an electrical connection portion, (D) is a state in which the bus bar unit is removed, and € is a state in which the nut is removed.
Figure 7:
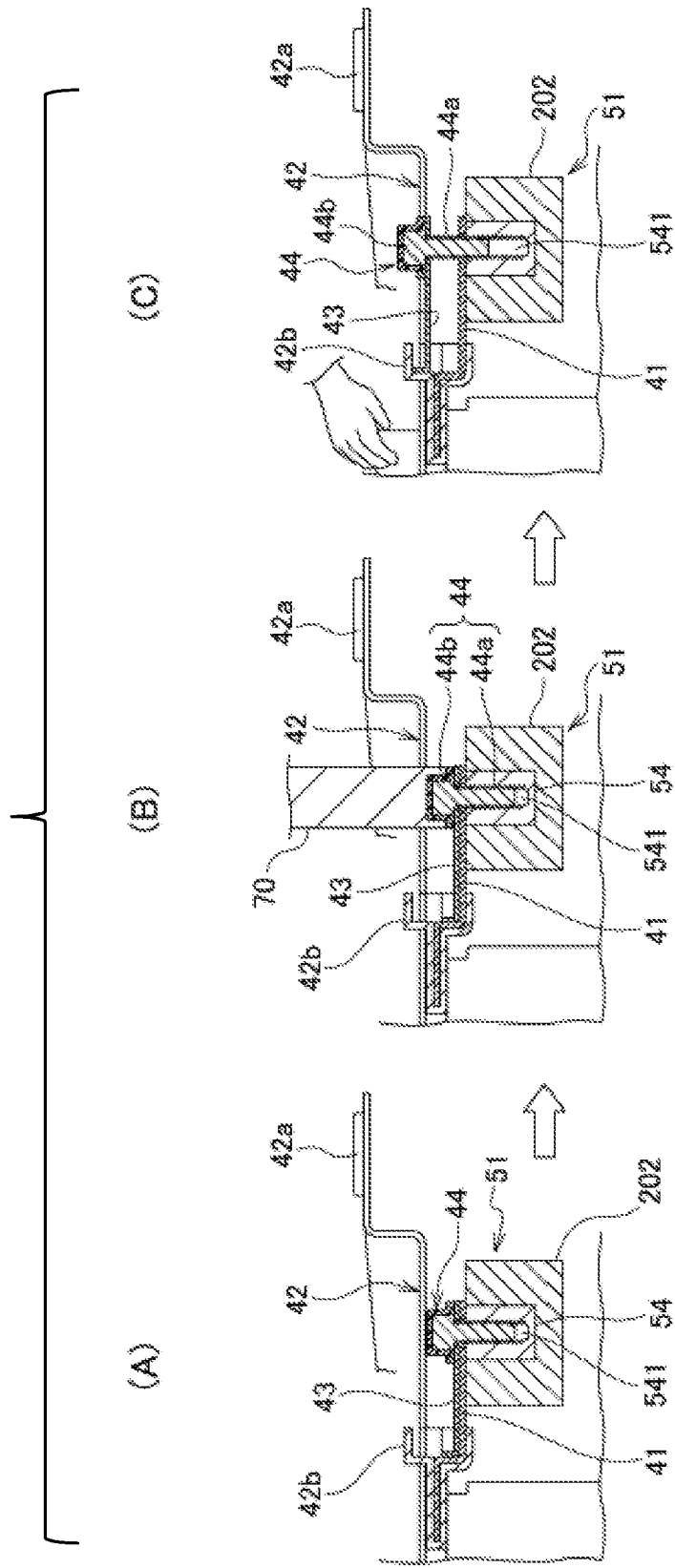
FIG. 7 is a sectional view of a main part of the bus bar unit for explaining a removal operation of the bus bar unit, in which (A) is a state before removing the bus bar unit, (B) is a state in which a bus bar fixing bolt is loosened, and (C) is a state when a plate member interferes with a movement restricting portion.

Next, a procedure for removing the case cover 12 will be described with reference to FIGS. 5 to 7.

First, as shown in FIG. 6(A), the maintenance lid 13 is removed from the case cover 12 in a state in which the opening portion 12a is closed by the maintenance lid 13, as shown in FIGS. 5(A) and 6(B).

Next, as shown in FIG. 6(C), the terminal covers 54 are opened. At the time point, it is possible to access to the electrical connection portions 51. That is, the bus bar fixing bolts 44 that fix the bus bar 41 and the plate members 43 to the terminal portions 53 of the battery modules 21, 22 can be removed from the terminal portions 53 of the battery modules 21, 22. Incidentally, the terminal cover 54 is not necessarily required.

As shown in FIG. 7(A), an operation of removing the bus bar fixing bolts 44 from the terminal portions 53 of the battery modules 21, 22 is performed using an insulating tool 70, as shown in FIG. 7(B), with respect to the bus bar fixing bolts 44 fastened to the terminal portions 53. Specifically, a worker fits the insulating tool 70 into the head 44b of the bus bar fixing bolt 44, and rotates the bus bar fixing bolt 44 in a loosening direction. The bus bar fixing bolt 44 moves upward with rotation, and the plate member 43 also moves upward together with the bus bar fixing bolt 44. As shown in FIG. 7(C), before the shaft portion 44a of the bus bar fixing bolt 44 comes out of the screw hole 541 of the terminal portion 53, the plate member 43 abuts against the movement restricting portion 42b of the bus bar cover 42. Then, when the bus bar fixing bolt 44 is further rotated in the loosening direction, a connection of the bus bar unit 40 and the battery modules 21 and 22 is released when the shaft portion 44a of the bus bar fixing bolt 44 is removed from the screw hole 541 of the terminal portion 53.

After the connection between the bus bar unit 40 and the battery modules 21, 22 is released as described above, the bus bar unit 40 is removed from the battery modules 21, 22 as shown in FIGS. 5(B) and 6(D). At this time, the bus bar 41 and the plate members 43 are removed from the battery modules 21, 22 together with the bus bar cover 42 and the bus bar fixing bolts 44.

At the time point, an electrical connection state between the battery modules 21, 22 is released, and it is possible to access to the fixing portion 60 including the cover fixing bolt 61, the nut 62, and the bracket 63. The worker accesses the fixing portion 60 and releases the fixing between the cover connecting portion 12d and the battery modules 21, 22. In this example, as shown in FIGS. 5(C) and 6(E), by removing the nut 62 from the cover fixing bolt 61, the fixing between the cover connecting portion 12d and the bracket 63 is released, and the case cover 12 can be removed from the case main body 11.

Then, as shown in FIG. 5(D), by removing the case cover 12 from the case main body 11, it is possible to perform a maintenance work inside the bus bar unit 40.

As described above, according to the present embodiment, since the case cover 12 cannot be removed from the case main body 11 unless the bus bar unit 40 is removed from the battery modules 21, 22, and the electrical connection state between the battery modules 21, 22 is released, the maintenance work inside the bus bar unit 40 can be safely performed by removing the case cover 12 from the case main body 11.

OTHER EMBODIMENTS

In the following description, components that are the same as or functionally common to those of the first embodiment are denoted by the same reference numerals, and the description thereof is omitted as appropriate.

Figure 8:
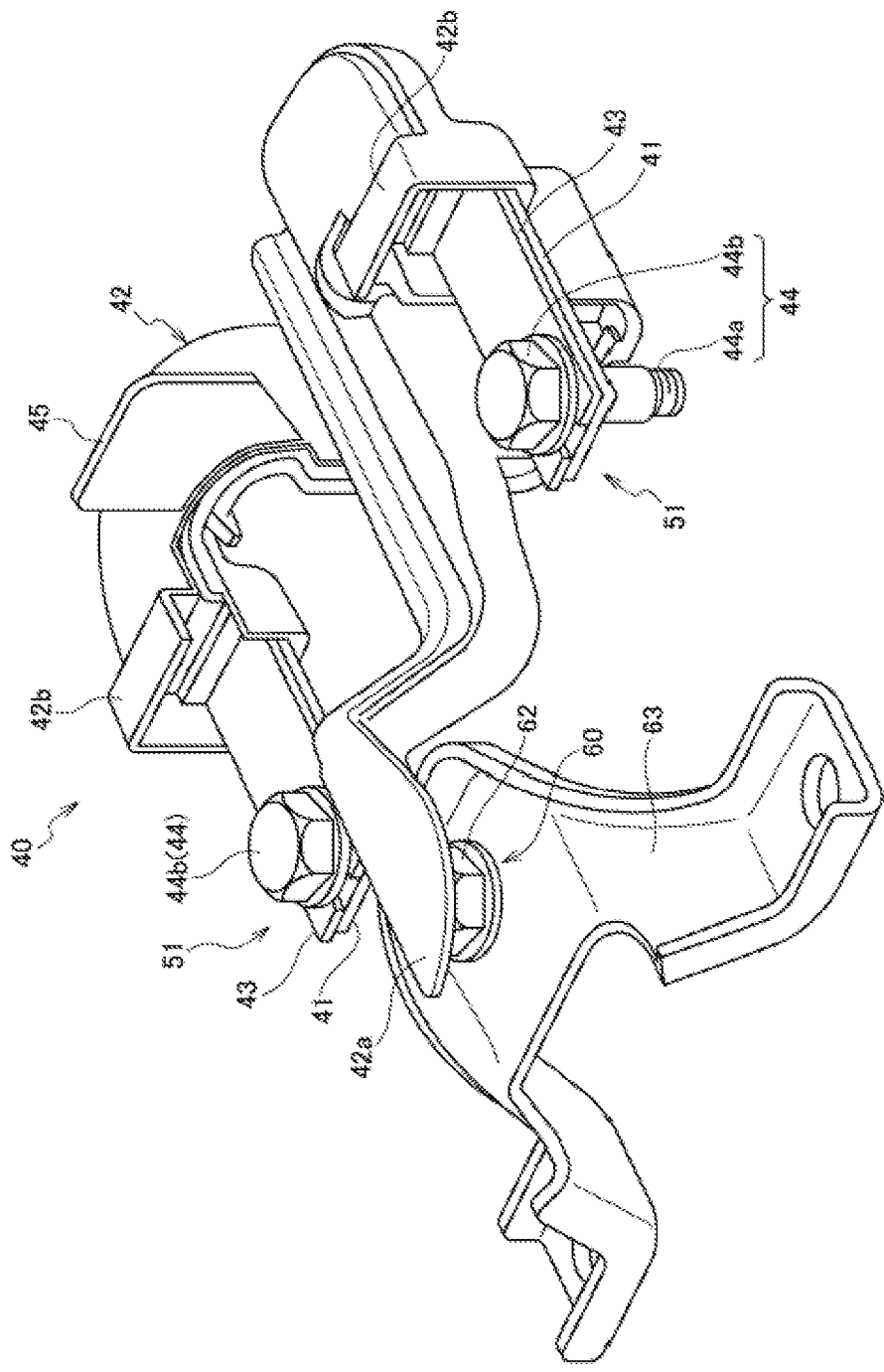
FIG. 8 is a perspective view of a bracket to which a bus bar unit and a cover connecting portion configuring an interlock structure according to a second embodiment of the present invention are fixed.

As shown in FIG. 8, the bus bar cover 42 of the bus bar unit 40 according to a second embodiment is provided with a gripping portion 45 capable of being gripped from the opening portion 12a. As described above, since the bus bar cover 42 is provided with the gripping portion 45 capable of being gripped from the opening portion 12a, a maintainability is improved.

Figure 9:
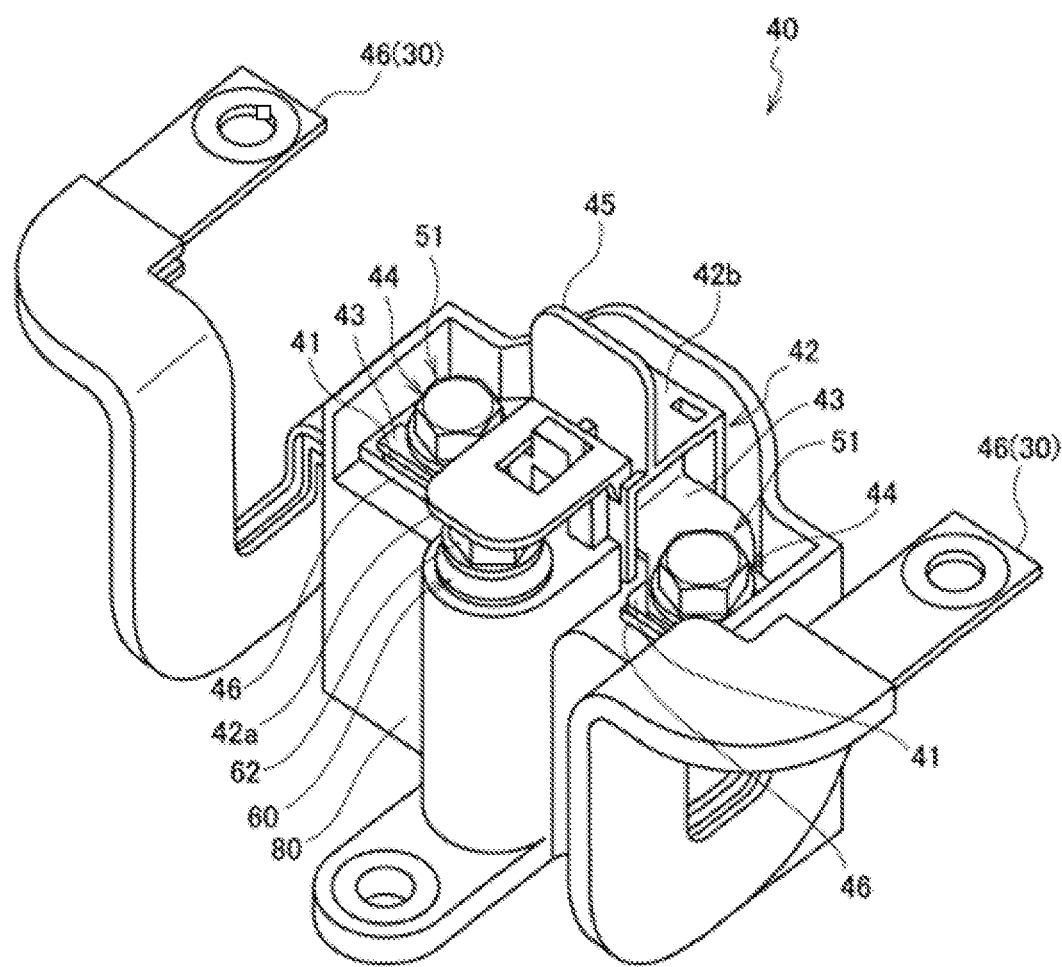
FIG. 9 is a perspective view of a terminal block to which a bus bar unit and a cover connecting portion configuring an interlock structure according to a third embodiment of the present invention are fixed.
Figure 10:
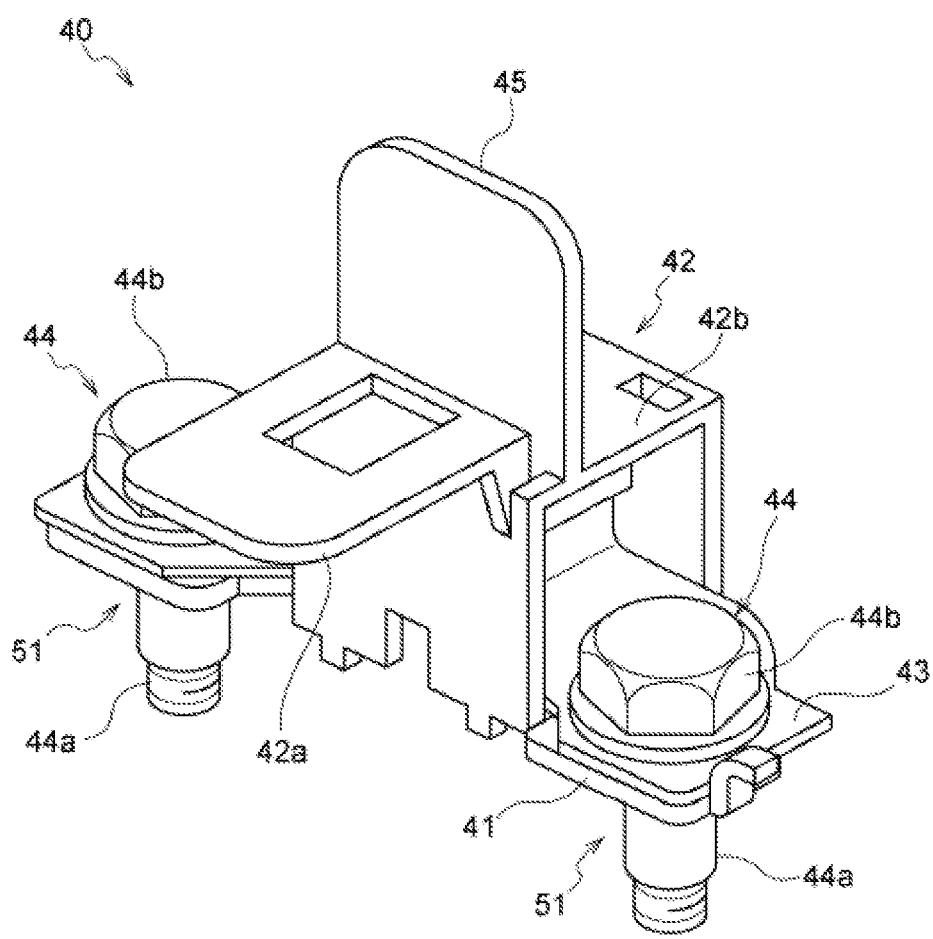
FIG. 10 is a perspective view of the bus bar unit of FIG. 9.

As shown in FIGS. 9 and 10, the bus bar unit 40 according to a third embodiment includes the bus bar 41 that electrically connects bus bars 46, 46 connected to the battery modules 21, 22, the insulating bus bar cover 42 provided so as not to be removable from the bus bar 41, the insulating plate member 43 covering an upper portion of the bus bar 41, and the bus bar fixing bolts 44, 44 that fix the bus bar 41 and the plate member 43 to the bus bars 46, 46 at the electrical connection portions 51. Further, the cover connecting portion 12d of the case cover 12 (not shown) is fixed to the fixing portion 60 provided on a terminal block 80. The bus bar cover 42 includes the shielding portion 42a that covers the fixing portion 60. The shielding portion 42a is configured to block the cover connecting portion 12d of the case cover 12 from being removed from the fixing portion 60 of the terminal block 80. In addition, the bus bar cover 42 according to the third embodiment is also provided with the gripping portion 45.

According to this configuration, the case cover 12 cannot be removed from the case main body 11 unless the bus bar fixing bolt 44 is loosened and the bus bar unit 40 is removed from the terminal block 80 to release the electrical connection state between the battery modules 21, 22. Incidentally, the terminal block 80 may be provided with a terminal block cover that covers the gripping portion 45.

The above-described embodiments can be appropriately modified, improved, or the like. For example, in the above embodiments, since the bus bar unit 40 includes the shielding portion 42a that blocks the cover connecting portion 12d from being removed from the battery modules 21, 22, that are the accommodation items, or the terminal block 80, the case cover 12 is restricted from being removed in a state in which the battery modules 21, 22 are electrically conducted. However, the bus bar unit 40 may also include the shielding portion 42a that blocks the cover connecting portion 12d from being removed from the case main body 11. This also restricts the case cover 12 from being removed in a state in which the battery modules 21, 22 are electrically conducted.

At least the following matters are described in the present specification. Components corresponding to the above-described embodiments are shown in parentheses, but the present invention is not limited thereto.

(1) A battery pack (battery pack 1) having an interlock structure, which includes:

a plurality of battery modules (battery module 20);

a case (case 10) that includes a case main body (case main body 11) accommodating the plurality of battery modules and a case cover (case cover 12) covering the case main body; and a bus bar unit (bus bar unit 40) that electrically conducts two battery modules (battery modules 21, 22) among the plurality of battery modules, in which the case cover includes a cover connecting portion (cover connecting portion 12d) connected to an accommodation item (battery modules 21, 22) accommodated in the case or the case main body, and the bus bar unit includes a shielding portion (shielding portion 42a) that blocks the cover connecting portion from being removed from the accommodation item or the case main body.

According to (1), since the bus bar unit includes the shielding portion that blocks the cover connecting portion from being removed from the accommodation item or the case main body, the case cover is restricted from being removed in a state in which the bus bar unit is not removed, that is, in a state in which the battery modules are electrically conducted. Therefore, the battery pack having the interlock structure can be realized with a simple configuration without using a ready-made product such as a service plug.

(2) In the battery pack having an interlock structure according to (1), the case cover includes an opening portion (opening portion 12a); and a connection portion (electrical connection portion 51) between the battery module and the bus bar unit is configured to be accessible from the opening portion.

According to (2), since the connecting portion between the battery modules and the bus bar unit is configured to be accessible from the opening portion of the case cover, it is possible to access to an interlock mechanism only by providing the opening portion in the case cover.

(3) In the battery pack having an interlock structure according to (2), the cover connecting portion is formed so as to extend toward an opening area (opening area 12c) of the opening portion, and a fixing portion (fixing portion 60) that directly or indirectly fixes the cover connecting portion and the accommodation item or the case main body is configured to be accessible from the opening portion.

According to (3), since the fixing portion that directly or indirectly fixes the cover connecting portion and the accommodation item or the case main body extends toward the opening area of the opening portion, the maintainability is improved.

(4) In the battery pack having an interlock structure according to (2) or (3), the battery module includes:
a cell stack body (cell stack body 201) that is configured by stacking a plurality of cells; and
a pair of end plates (end plates 202) that is arranged on both sides of the cell stack body in a stacking direction, and the bus bar unit is fastened to terminal portions respectively arranged on the end plates facing each other of the two battery modules.

According to (4), the bus bar unit is fastened to the terminal portions respectively arranged on the end plates facing each other of the two battery modules, so that a length of the bus bar unit can be shortened.

(5) In the battery pack having an interlock structure according to (4), the cover connecting portion is directly or indirectly fixed to the end plates facing each other of the two battery modules.

According to (5), since the cover connecting portion is directly or indirectly fixed to the end plates to which the bus bar unit is fastened, an area of the opening portion can be reduced.

(6) In the battery pack having an interlock structure according to any one of (2) to (5), the bus bar unit includes:
a bus bar (bus bar 41) that electrically connects the two battery modules;
an insulating bus bar cover (bus bar cover 42) that is provided so as not to be removable from the bus bar:
a plate member (plate member 43) that is arranged on an upper portion of the bus bar; and
a bolt (bus bar fixing bolt 44) that fixes the bus bar and the plate member to the battery module at the electrical connection portion, in which an upper surface of the plate member and a head (head 44b) of the bolt have an insulation property, and the head of the bolt, the plate member, the bus bar, and the battery module are arranged in this order from the opening portion.

According to (6), since the head of the bolt and the plate member have the insulation property, the insulation property of a portion close to the opening portion can be ensured.

(7) In the battery pack having an interlock structure according to (6), the bolt and the plate member are connected to each other, the bus bar cover includes a movement restricting portion (movement restricting portion 42b) that restricts a movement of the plate member in a state in which the bolt is loosened, and a length of a shaft portion (shaft portion 44a) of the bolt is longer than a maximum distance between the plate member and the movement restricting portion in a state in which the bolt is loosened.

According to (7), since the bus bar cover includes the movement restricting portion that restricts the movement of the plate member in a state in which the bolt is loosened, and the length of the shaft portion of the bolt is longer than the maximum distance between the plate member and the movement restricting portion in a state in which the bolt is loosened, the bus bar unit can be handled integrally even if the bolt is loosened.

(8) In the battery pack having an interlock structure according to (6) or (7), the shielding portion is provided on the bus bar cover.

According to (8), since the shielding portion is provided in the bus bar cover that covers the bus bar, the bus bar cover serves both as an interlock function as well as a function of ensuring the insulation property of the bus bar.

(9) In the battery pack having an interlock structure according to any one of (6) to (8), the bus bar cover includes a gripping portion (gripping portion 45) capable of being gripped from the opening portion.

According to (9), since the bus bar cover is provided with the gripping portion capable of being gripped from the opening portion, the maintainability is improved.

(10) In the battery pack having an interlock structure according to any one of (2) to (8), the cover connecting portion is fixed to a bracket (bracket 63) or a terminal block (terminal block 80) fixed to the accommodation item.

According to (10), since the cover connecting portion is fixed to the bracket or the terminal block fixed to the accommodation item, the fixing portion of the cover connecting portion can be arranged in a vicinity of the opening portion, and the maintainability is improved.

The invention claimed is:

1. A battery pack having an interlock structure, comprising:
a plurality of battery modules;
a case that includes a case main body accommodating the plurality of battery modules and a case cover covering the case main body; and
a bus bar unit that electrically conducts two battery modules among the plurality of battery modules,
wherein the case cover includes a cover connecting portion connected to an accommodation item accommodated in the case or the case main body,
wherein the bus bar unit includes a shielding portion that blocks the cover connecting portion from being removed from the accommodation item or the case main body, wherein in a direction in which the cover connecting portion is removed, the shielding portion is disposed so as to be positioned above the cover connecting portion, wherein the case cover includes an opening portion, wherein an electrical connection portion between the battery module and the bus bar unit is configured to be accessible from the opening portion, wherein the bus bar unit includes:
- a bus bar that electrically connects the two battery modules;
- an insulating bus bar cover that is provided so as not to be removable from the bus bar;
- a plate member that is arranged on an upper portion of the bus bar; and
- a bolt that fixes the bus bar and the plate member to the battery module at the electrical connection portion, wherein an upper surface of the plate member and a head of the bolt have an insulation property, and wherein the head of the bolt, the plate member, the bus bar, and the battery module are arranged in this order from the opening portion.

2. The battery pack having an interlock structure according to claim 1,
wherein the cover connecting portion is formed so as to extend toward an opening area of the opening portion, and
wherein a fixing portion that directly or indirectly fixes the cover connecting portion and the accommodation item or the case main body is configured to be accessible from the opening portion.

3. The battery pack having an interlock structure according to claim 1,
wherein the battery module includes:
- a cell stack body that is configured by stacking a plurality of cells; and
- a pair of end plates that are arranged on both sides of the cell stack body in a stacking direction, and wherein the bus bar unit is fastened to terminal portions respectively arranged on the end plates facing each other of the two battery modules.

4. The battery pack having an interlock structure according to claim 3,
wherein the cover connecting portion is directly or indirectly fixed to the end plates facing each other of the two battery modules.

5. The battery pack having an interlock structure according to claim 1,
wherein the bolt and the plate member are connected to each other,
wherein the bus bar cover includes a movement restricting portion that restricts a movement of the plate member in a state in which the bolt is loosened, and
wherein a length of a shaft portion of the bolt is longer than a maximum distance between the plate member and the movement restricting portion in a state in which the bolt is loosened.

6. The battery pack having an interlock structure according to claim 1,
wherein the shielding portion is provided on the bus bar cover.

7. The battery pack having an interlock structure according to claim 1,
wherein the bus bar cover includes a gripping portion capable of being gripped from the opening portion.

8. The battery pack having an interlock structure according to claim 1,
wherein the cover connecting portion is fixed to a bracket or a terminal block fixed to the accommodation item.

9. The battery pack having an interlock structure according to claim 1,
wherein the shielding portion is disposed so as to completely cover the cover connection portion from above.

* * * * *